US012662644B2

(12) United States Patent
Hiratsuka et al.

(10) Patent No.: US 12,662,644 B2
(45) Date of Patent: Jun. 23, 2026

(54) REFRIGERATION CYCLE DEVICE USING REFRIGERANTS CONTAINING HYDROCARBON AND SULFUR-BASED ODORANT

(71) Applicant: Mitsubishi Electric Corporation, Tokyo (JP)

(72) Inventors: Kengo Hiratsuka, Tokyo (JP); Satoru Toyama, Tokyo (JP); Kenji Kojima, Tokyo (JP); Manami Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/692,040

(22) PCT Filed: Aug. 23, 2022

(86) PCT No.: PCT/JP2022/031731
§ 371 (c)(1),
(2) Date: Mar. 14, 2024

(87) PCT Pub. No.: WO2023/079817
PCT Pub. Date: May 11, 2023

(65) Prior Publication Data

US 2024/0425773 A1 Dec. 26, 2024

(30) Foreign Application Priority Data

Nov. 8, 2021 (WO) .................. PCT/JP2021/040982

(51) Int. Cl.
*C09K 5/04* (2006.01)
*C10M 107/34* (2006.01)
(Continued)

(52) U.S. Cl.
CPC ........... *C10M 107/34* (2013.01); *C09K 5/042* (2013.01); *F25B 31/002* (2013.01);
(Continued)

(58) Field of Classification Search
CPC ................ F25B 31/002; F25B 2500/16; F25B 2400/12; C09K 5/041; C09K 5/042;
(Continued)

(56) References Cited

U.S. PATENT DOCUMENTS

2002/0035848 A1* 3/2002 Komatsubara ......... C09K 5/042
62/502
2015/0041705 A1* 2/2015 Saito .................. C10M 171/008
252/68
(Continued)

FOREIGN PATENT DOCUMENTS

EP 0421586 A1 4/1991
EP 1094100 A1 * 4/2001 ............. C09K 5/042
(Continued)

OTHER PUBLICATIONS

Extended European Search Report issued Oct. 29, 2024, in corresponding European Patent Application No. 22889642.9, 8pp.
(Continued)

*Primary Examiner* — Jerry-Daryl Fletcher
*Assistant Examiner* — Daniel C Comings
(74) *Attorney, Agent, or Firm* — XSENSUS LLP

(57) ABSTRACT

A refrigeration cycle device can include a refrigerant circuit that includes a compressor. A refrigerant can be enclosed in the refrigerant circuit, particularly where the refrigerant can contain a hydrocarbon having 1 to 4 carbon atoms and a sulfur-based odorant. The compressor can be filled with a refrigeration oil, where the refrigeration oil can contain a
(Continued)

base oil, and where the ratio of the number of oxygen atoms to the number of carbon atoms in the molecular structure of the base oil is less than 0.50.

8 Claims, 3 Drawing Sheets

(51) Int. Cl.
*F25B 31/00* (2006.01)
*C10N 40/30* (2006.01)

(52) U.S. Cl.
CPC .... *C09K 2205/12* (2013.01); *C09K 2205/134* (2013.01); *C10M 2209/1075* (2013.01); *C10N 2040/30* (2013.01); *F25B 2500/222* (2013.01)

(58) Field of Classification Search
CPC ......... C09K 2205/12; C09K 2205/134; C10M 2209/1075
See application file for complete search history.

(56) References Cited

U.S. PATENT DOCUMENTS

| | | | | |
|---|---|---|---|---|
| 2016/0333245 | A1* | 11/2016 | Fujii | C10M 105/38 |
| 2016/0347982 | A1* | 12/2016 | Fukushima | F25B 31/002 |

FOREIGN PATENT DOCUMENTS

| | | | | |
|---|---|---|---|---|
| EP | 1632543 | A2 | 3/2006 | |
| JP | H08-176536 | A | 7/1996 | |
| JP | 2002-038135 | A | 2/2002 | |
| JP | 2020-112285 | A | 7/2020 | |
| WO | 00/60021 | A1 | 10/2000 | |
| WO | WO-2014051108 | A1 * | 4/2014 | C08F 8/04 |
| WO | 2021/166028 | A1 | 8/2021 | |

OTHER PUBLICATIONS

Japanese Decision to Grant issued Feb. 21, 2023, in corresponding Japanese Patent Application No. 2022-577718, 5 pages.
International Search Report and Written Opinion mailed on Oct. 11, 2022, received for PCT Application PCT/JP2022/031731, filed on Aug. 23, 2022, 9 pages including English Translation.
Schomaker et al., "The Electron Diffraction Investigation of the Structure of Benzene, Pyridine, Pyrazine, Butadiene-1,3, Cyclopentadiene, Furan, Pyrrole, and Thiophene", J.Am.Chem. Soc., vol. 61, Jul. 1939, pp. 1769-1780.
David R. Lide Jr., "Structure of the Isobutane Molecule; Change of Dipole Moment on Isotopic Substitution", The Journal of Chemical Physics, vol. 33, No. 5, Nov. 1960, pp. 1519-1522.
Lide et al., "Microwave Spectra of Molecules Exhibiting Internal Rotation. I. Propylene", The Journal of Chemical Physics, vol. 27, No. 4, Oct. 1957, pp. 868-873.
Lide et al., "Microwave Spectra of Molecules Exhibiting Internal Rotation. IV. Isobutane, Tertiary Butyl Fluoride, and Trimethylphospine", The Journal of Chemical Physics, vol. 29, No. 4, Aug. 13, 2004, pp. 914-920.
Journal of the Japan Air Pollution Society, vol. 27, No. 2, 1992, pp. A17-A24 (10 pages including Partial English Translation).
Extended European search report issued on Nov. 20, 2024, in corresponding European patent Application No. 21963331.0, 7 pages.
Office Action issued on Jun. 20, 2025, in corresponding European patent Application No. 22889642.9, 6 pages.
Extended European search report issued on Sep. 2, 2025, in corresponding European patent Application No. 25174414.0, 7 pages.
Office Action issued on Feb. 18, 2026, in corresponding European patent Application No. 22889642.9, 2 pages.

* cited by examiner

THT CONCENTRATION
IN COLLECTED
REFRIGERANT GAS
(PPM BY MASS)

THT CONCENTRATION IN ENCLOSED
REFRIGERANT (PPM BY MASS)

ODOR INDEX
(EQUIVALENT VALUE)

THT CONCENTRATION IN SAMPLE GAS
(PPB BY MASS)

REFRIGERATION CYCLE DEVICE USING REFRIGERANTS CONTAINING HYDROCARBON AND SULFUR-BASED ODORANT

CROSS-REFERENCE TO RELATED APPLICATIONS

This application is a national stage application, pursuant to 35 U.S.C. § 371, of International Patent Application No. PCT/JP2022/031731, filed Aug. 23, 2022, which further claims priority from International Patent Application No. PCT/JP2021/040982, filed Nov. 8, 2021, the entire contents of each are incorporated herein by reference.

TECHNICAL FIELD

The present disclosure relates to a refrigeration cycle device.

BACKGROUND ART

The refrigerant used for a refrigeration cycle device is currently restricted by, for example, the Fluorocarbon Emissions Control Act (enacted on April 2015). Specifically, the upper limit is set on the Global Warming Potential (GWP) value of the refrigerant to be used. Thus, use of a refrigerant having a further low GWP is needed.

In recent years, for example, hydrocarbons having 1 to 4 carbon atoms such as R-290 (propane), R-1270 (propylene), R-600 (butane), and R-600a (isobutane) are examined as the refrigerant having a low GWP value. The hydrocarbons having 1 to 4 carbon atoms have a further lower GWP value than saturated fluorinated hydrocarbon compounds (hydrofluorocarbons), which are refrigerants having a relatively low GWP value.

However, the hydrocarbons having 1 to 4 carbon atoms have higher flammability than hydrofluorocarbons. For example, in the international standard ISO-817, which defines safety classification for refrigerants, R-32 (difluoromethane), one of the hydrofluorocarbons, is registered as lower flammability (Class 2L), and on the other hand, R-290, R-1270, R-600, and R-600a are registered as higher flammability (Class 3).

For example, when a refrigerant having high flammability, such as a hydrocarbon having 1 to 4 carbon atoms, is used as the refrigerant for a refrigeration cycle device, it is preferable to take a measure of making the refrigerant recognizable by the sense of smell or the sense of vision.

As the measure of making the refrigerant recognizable by the sense of smell, for example, Patent Literature 1 (WO 2021/166028) discloses a method including mixing a sulfur-based odorant with the refrigerant and detecting the leakage of the refrigerant by an unpleasant odor.

Patent Literature 2 (Japanese Patent Laying-Open No. 2002-38135) discloses that tetrahydrothiophene (THT) is preferable as an odorant since it does not react with the material for the refrigerating circuit, has compatibility with the refrigerant, and has compatibility with refrigeration oil.

CITATION LIST

Patent Literature

PTL 1: WO 2021/166028
PTL 2: Japanese Patent Laying-Open No. 2002-38135

SUMMARY OF INVENTION

Technical Problem

However, the inventors have found the following: sulfur-based odorants such as THT have polarity due to the bias of charge in the molecule; thus, when a refrigeration oil having high polarity is used, the sulfur-based odorant is dissolved in the refrigeration oil in a compressor so that the amount of the sulfur-based odorant that circulates in the refrigerant circuit with the refrigerant is reduced; and when the refrigerant is released from the refrigeration cycle device, the refrigerant is hardly detectable by the sense of smell. In particular, since polyalkylene glycol, polyol ester, polyvinyl ether, and the like used as the base oil for the refrigeration oil contain a large amount of oxygen (O), which is an element having a large electronegativity in the molecular structure, they are refrigeration oils having high polarity and dissolve a large amount of sulfur-based odorants depending on the composition.

The present disclosure has been made in view of the above problems, and an object of the present disclosure is to provide a refrigeration cycle device that suppresses the dissolution of a sulfur-based odorant in a refrigeration oil and makes the leakage of a refrigerant recognizable by the sense of smell.

Solution to Problem

A refrigeration cycle device according to one aspect of the present disclosure includes a refrigerant circuit including a compressor, wherein a refrigerant is enclosed in the refrigerant circuit,
the refrigerant contains a hydrocarbon having 1 to 4 carbon atoms and a sulfur-based odorant,
the compressor is filled with a refrigeration oil,
the refrigeration oil contains a base oil, and
the ratio of the number of oxygen atoms to the number of carbon atoms in the molecular structure of the base oil is less than 0.50.

A refrigeration cycle device according to another aspect of the present disclosure includes a refrigerant circuit including a compressor, wherein a refrigerant is enclosed in the refrigerant circuit,
the refrigerant contains a hydrocarbon having 1 to 4 carbon atoms and a sulfur-based odorant,
the compressor is filled with a refrigeration oil,
the refrigeration oil contains a base oil, and
the difference between the HSP distance between the base oil and the sulfur-based odorant and the HSP distance between the base oil and the hydrocarbon having 1 to 4 carbon atoms is −2.0 or more.

Advantageous Effect of Invention

According to the present disclosure, a refrigeration cycle device that suppresses the dissolution of the sulfur-based odorant in the refrigeration oil and makes the leakage of the refrigerant recognizable by the sense of smell can be provided.

DESCRIPTION OF EMBODIMENTS

Figure 1:
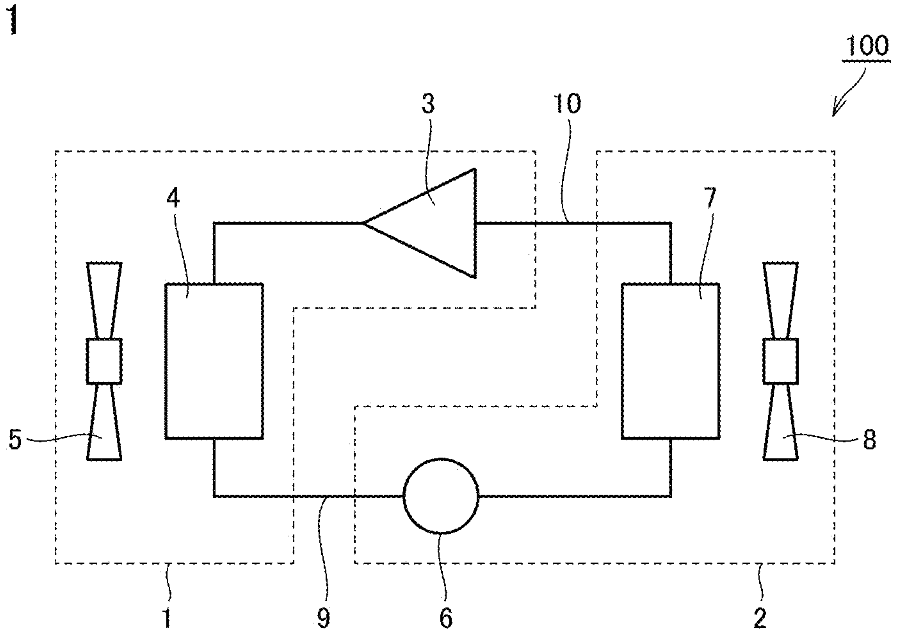
FIG. 1 is a schematic configuration diagram showing one example of a refrigeration cycle device according to an embodiment 1.

Hereinafter, the embodiments of the present disclosure will be described with reference to the drawings. In the drawings, the dimensional relationship of the length, width, thickness, depth, and the like is appropriately changed for the purpose of clarity and simplification of the drawing, and does not indicate the actual dimensional relationship.

Embodiment 1

First, the outline of the refrigeration cycle device of the present embodiment is briefly described. FIG. 1 is a schematic configuration diagram showing one example of the refrigeration cycle device according to embodiment 1. An outdoor unit 1 includes a compressor 3, a condenser 4, an outdoor blower 5, and the others, and compressor 3 and condenser 4 are connected via piping. An indoor unit 2 includes an expansion valve 6, an evaporator 7, an indoor blower 8, and the others, and expansion valve 6 and evaporator 7 are connected via piping.

Compressor 3 of outdoor unit 1 and evaporator 7 of indoor unit 2 are connected via a gas pipe 10. Condenser 4 of outdoor unit 1 and expansion valve 6 of indoor unit 2 are connected via a liquid pipe 9.

A refrigerant circuit 100 is formed by such a refrigeration cycle device configuration, and a refrigerant is circulated in refrigerant circuit 100 via liquid pipe 9 and gas pipe 10.

Compressor 3 compresses the refrigerant that has turned into a gaseous state in gas pipe 10. Condenser 4 cools the gaseous refrigerant that has been compressed by compressor 3 to form a high-pressure liquid refrigerant or a gas-liquid two-phase refrigerant. Expansion valve 6 reduces the pressure of the high-pressure liquid refrigerant or the gas-liquid two-phase refrigerant. Evaporator 7 heats the refrigerant reduced in pressure to form a low-pressure gaseous refrigerant. Compressor 3 sucks and recompresses the refrigerant that has turned into a low-pressure gaseous state by evaporator 7.

Outdoor blower 5 is a constituent that sends air to condenser 4, and is provided to promote the absorption and release of heat by the heat exchange of the refrigerant flowing in condenser 4 with air. Indoor blower 8 is a constituent that sends air to evaporator 7, and is provided to promote the absorption and release of heat by the heat exchange of the refrigerant flowing in evaporator 7 with air.

In the present embodiment, the configuration for carrying out the heat exchange of condenser 4 and evaporator 7 with air is described, but the configuration is not limited to this configuration. For example, condenser 4 and evaporator 7 may be configured so as to exchange heat with not air but a liquid such as water.

In the present embodiment, the configuration in which evaporator 7 is provided in indoor unit 2 is described, but the configuration is not limited to this configuration. For example, condenser 4 may be arranged on the inside, and evaporator 7 may be arranged on the outside.

With respect to outdoor unit 1 as described above, for example, a four-way valve or a combination of a plurality of valves may be arranged, or a switching mechanism that switches an inlet pipe and a discharge pipe of compressor 3 may be provided. By providing a switching mechanism, the heat exchanger in outdoor unit 1 functions as evaporator 7 and the heat exchanger in indoor unit 2 functions as condenser 4, whereby heating of the indoor using the outdoor heat is enabled.

The refrigeration cycle device may be, for example, any of a device capable of carrying out both cooling and heating, a device capable of carrying out only cooling, or a device capable of carrying out only heating. The application of the refrigeration cycle device according to the present embodiment is not limited to air conditioning, and may be freezing, refrigerating, and hot water supply, for example.

In the present embodiment, the configuration in which expansion valve 6 is provided in indoor unit 2 is described, but the configuration is not limited to this configuration. For example, expansion valve 6 may be arranged in outdoor unit 1. For example, expansion valve 6 may be provided on both outdoor unit 1 and indoor unit 2. Further, for example, a plurality of indoor units 2 or a plurality of outdoor units 1 may be provided in refrigerant circuit 100.

<Refrigerant>

Next, the refrigerant enclosed in the refrigerant circuit in the present embodiment will be described. The refrigerant contains a main component that functions as the refrigerant, and further contains a sulfur-based odorant for detecting the leakage of the refrigerant.

Herein, the aforementioned "main component" is the component excluding the sulfur-based odorant and impurities (such as air, moisture, and by-products that may be mixed during the synthesis or purification of a refrigerant compound) from the refrigerant. The main component of the refrigerant may be a single refrigerant or a mixture of a plurality of refrigerants. The content of the main component in the refrigerant is more than 50% by mass, preferably 90% by mass or more, and more preferably 95% by mass or more.

The main component functions as the refrigerant is a hydrocarbon having 1 to 4 carbon atoms. Examples of the hydrocarbon having 1 to 4 carbon atoms include R-290 (propane), R-1270 (propylene), R-600 (butane), and R-600a (isobutane). The hydrocarbon having 1 to 4 carbon atoms is preferably propane, propylene, or a mixture thereof. This is because they have an operating pressure suitable for use for the refrigeration cycle device. In view of oxidation stability, propane is more preferable. According to the Sixth Assessment Report of the IPCC, propane has a GWP value significantly as low as 0.02 and high cooling performance, and may thus contribute to the reduction in environmental load during the production and operation of the refrigeration cycle device.

The refrigerant may further contain a halogenated hydrocarbon. Examples of the halogenated hydrocarbon include chlorofluorocarbon, hydrochlorofluorocarbon, hydrofluorocarbon, hydrofluoroolefin, hydrochlorofluoroolefin, and fluoroiodocarbon. The halogenated hydrocarbon, in which a hydrogen atom of a hydrocarbon is replaced with a halogen atom, has a lower flammability than the hydrocarbon, and can reduce the flammability of the refrigerant by being mixed. The refrigerant circuit may be filled with the halogenated hydrocarbon in a state of being mixed with the hydrocarbon having 1 to 4 carbon atoms, or the refrigerant circuit filled with the halogenated hydrocarbon or the refrigerant circuit in which the halogenated hydrocarbon slightly remains may be additionally filled with the hydrocarbon having 1 to 4 carbon atoms.

The halogenated hydrocarbon preferably has an operating pressure similar to that of the hydrocarbon having 1 to 4 carbon atoms. Consequently, azeotropy with the hydrocarbon having 1 to 4 carbon atoms, which is the main component of the refrigerant, increases, and high cooling performance can be obtained. Such a halogenated hydrocarbon is a halogenated hydrocarbon having 1 to 4 carbon atoms, and more preferably a halogenated hydrocarbon having 1 to 3 carbon atoms. This is because the halogenated hydrocarbon has a large molecule by halogenation of a hydrocarbon as compared with the hydrocarbon, and has a reduced operating pressure as compared with a hydrocarbon having the same number of carbon atoms. Examples of the halogenated hydrocarbon having 1 to 3 carbon atoms include HFC-23, HFC-32, HFC-41, HFC-125, HFC-134, HFC-134a, HFC-143, HFC-143a, HFC-152, HFC-152a, HFC-161, HFO-1141, HFO-1132a, HFO-1132 (E), HFO-1132 (Z), HFO-1123, HFO-1225ye (Z), HFO-1225ye (E), HFO-1225zc, HFO-1234yf, HFO-1234ze (E), HFO-1234ze (Z), HFO-1234ye (Z), HFO-1234ye (E), HFO-1243zf, HFO-1252zf, HFO-1261yf, FIC-1311 ($CF_3I$), HCFC-22, and CFC-12.

The refrigerant may contain carbon dioxide (R-744). Carbon dioxide has a GWP as low as 1 and may thus contribute to the reduction in environmental load during the production of the refrigeration cycle device. In addition, carbon dioxide is non-flammable and can thus reduce the flammability of the refrigerant by being mixed.

When air is contained in the refrigerant, the deterioration of the refrigerant, the sulfur-based odorant, the refrigeration oil mentioned later, materials in the compressor, and the others may be promoted, and thus, the air in the refrigerant circuit is preferably removed before the refrigerant circuit is filled with the refrigerant.

(Sulfur-Based Odorant)

The sulfur-based odorant blended in the refrigerant is an odorant containing a sulfur element. Examples of the sulfur-based odorant include mercaptans, sulfides, and thiophenes. Examples of mercaptans include methyl mercaptan (MM), ethyl mercaptan (EM), normal propyl mercaptan (NPM), isopropyl mercaptan (IPM), and tert-butyl mercaptan (TBM); examples of sulfides include dimethyl sulfide (DMS), diethyl sulfide (DES), and methyl ethyl sulfide (MES); and examples of thiophenes include tetrahydrothiophene (THT). These sulfur-based odorants are compounds that have been used in fuel gas and have an unpleasant odor. One of these sulfur-based odorants may be used singly, or two or more thereof may be used in combination.

The sulfur-based odorant is preferably EM, NPM, IPM, TBM, DMS, MES, THT, which are also used in fuel gas for households, or a mixture thereof. Mixing a sulfur-based odorant used in fuel gas for households in the refrigerant enables the leakage of the refrigerant to be easily detected by an unpleasant odor inherent in the sulfur-based odorant.

The sulfur-based odorant is more preferably THT. THT is chemically stable as compared with mercaptans and sulfides, so that it hardly causes a decomposition reaction or a corrosion reaction in the refrigerant circuit, and THT also hardly causes solidification in the refrigerant circuit because of its melting point as low as −96° C.

The content of the sulfur-based odorant is preferably 50 ppm by mass or more and less than 1,100 ppm by mass. The reason for this is as follows: when the content of the sulfur-based odorant is within the above range, the leakage of the refrigerant from the refrigerant circuit can be easily detected and a not excessively unpleasant odor is obtained. The content of the sulfur-based odorant is more preferably 90 ppm by mass or more and less than 1,026 ppm by mass, and further preferably 176 ppm by mass or more and less than 987 ppm by mass.

However, the sulfur-based odorant may deteriorate due to, for example, the reaction with mixed oxygen by the operation of the refrigeration cycle device over a long period. For example, THT may be changed into an oxide such as tetramethylene sulfoxide due to oxidative deterioration, and the odor may be reduced. Thus, depending on the applications of the refrigeration cycle device, the concentration of the sulfur-based odorant is preferably set high to sustain the effect of making the refrigerant detectable by the sense of smell over a long period.

The sulfur-based odorant may be a compound that is not used as the odorant in fuel gas, as long as it is a compound containing a sulfur element. For example, hydrogen sulfide, carbonyl sulfide, and the like have an inherent unpleasant odor similar to the aforementioned sulfur-based odorants, and can easily detect the leakage of the refrigerant.

The refrigerant may further contain an odorant containing no sulfur. This is because the odorant containing no sulfur hardly causes a corrosion reaction of metal in the refrigerant circuit, as in the case of THT. Examples of the odorant containing no sulfur include cyclohexene, acrylic acid esters, ammonia, amines, pyrazines, and norbornenes. The refrigerant may further contain a compound having an inherent odor as an odorant, other than these odorants containing no sulfur.

<Compressor>

In the present embodiment, the refrigeration cycle device includes a compressor. The refrigerant passes through the inside of the compressor. The compressor is filled with a refrigeration oil. The refrigeration oil contains a base oil.

Figure 2:
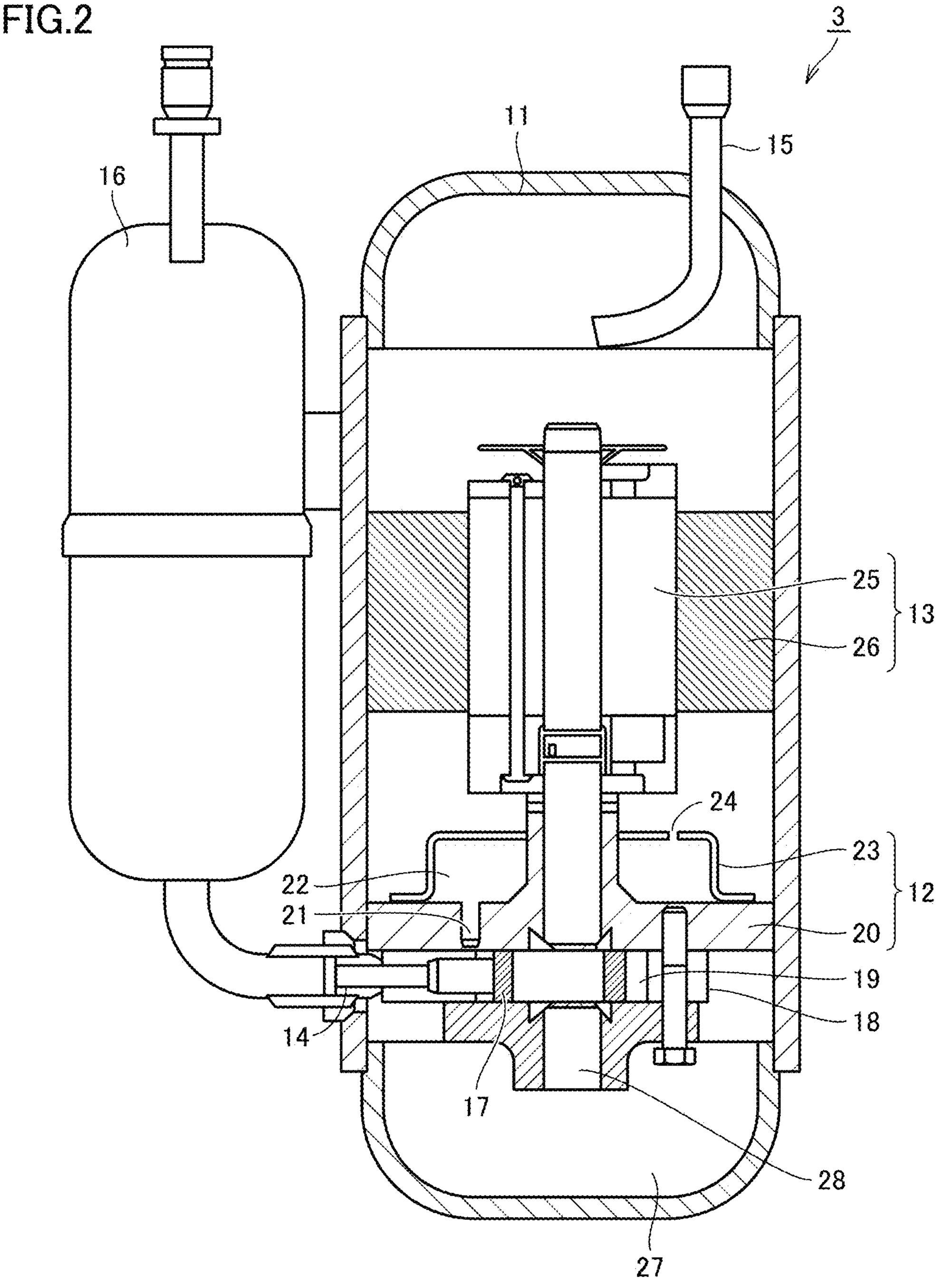
FIG. 2 is a schematic cross-sectional view showing one example of a compressor of the refrigeration cycle device according to embodiment 1.

FIG. 2 is a schematic cross-sectional view showing one example of the compressor of the refrigeration cycle device according to the present embodiment. Compressor 3 includes a shell 11, as shown in FIG. 2. Shell 11 includes a compression mechanism 12 in the inside thereof, and includes an electric motor 13 which drives compression mechanism 12. In addition, an inlet pipe 14 for allowing the refrigerant to be flowed into the inside and a discharge pipe 15 for allowing the refrigerant to be flowed to the outside are connected to shell 11. An accumulator 16 which separates gas and liquid in the refrigerant and sends steam into inlet pipe 14 is connected to the upstream side of inlet pipe 14.

The refrigerant that has passed through accumulator 16 flows from inlet pipe 14 into compression mechanism 12 in shell 11. The refrigerant that has flowed into compression mechanism 12 is compressed to have high temperature and high pressure, and is discharged from discharge pipe 15. That is, compression mechanism 12 is configured to compress the refrigerant that has flowed from inlet pipe 14 into shell 11 and discharge the refrigerant from discharge pipe 15.

Compression mechanism 12 is a rotary-type compression mechanism composed of a combination of a rolling piston 17 and a vane (not shown) and the like. The refrigerant is compressed by changing the volume of a space surrounded by the inner peripheral surface of a cylinder chamber 19 of a cylinder 18 and the outer peripheral surface of rolling piston 17 and the vane (not shown) by an eccentric rotary motion of rolling piston 17.

The compressed refrigerant is discharged from a discharge hole 21 of an upper bearing 20 to a muffler space 22, and then discharged from a discharge hole 24 of a discharge muffler 23 into shell 11. The discharged refrigerant passes through a gap in electric motor 13 (such as a gap between an electric motor rotor 25 and an electric motor stator 26 or a groove provided on the outer peripheral surface of the electric motor stator 26), and is then discharged from discharge pipe 15 to the downstream side of the refrigerant circuit 100.

Compressor 3 has a sliding part on the inside of compression mechanism 12. For lubrication of the sliding part, a refrigeration oil is stored in an oil reservoir part 27, which is located below compressor 3. The refrigeration oil stored in oil reservoir part 27 is supplied through an oil supply hole (not shown) provided in the shaft of a driving shaft 28 to the sliding part in the inside of compression mechanism 12 by pumping action. Since the refrigeration oil is brought into contact with the refrigerant in compressor 3, a part of the refrigerant is dissolved in the refrigeration oil.

<Refrigeration Oil>

Next, the refrigeration oil that fills the inside of the compressor for lubrication in the present embodiment will be described. The refrigeration oil includes a base oil. The base oil is at least one selected from the group consisting of an oxygen-containing oil and a hydrocarbon oil. Examples of the oxygen-containing oil include polyalkylene glycol (PAG), polyol ester (POE), and polyvinyl ether (PVE). Examples of the hydrocarbon oil include polyalphaolefin (PAO), alkylbenzene (AB), alkylnaphthalene (AN), and mineral oil.

Herein, the base oil is a component that lubricates the inside of the compressor by the kinematic viscosity of the substance thereof. The base oil is preferably a substance having a higher kinematic viscosity than the refrigerant, and more preferably one having a kinematic viscosity at 40° C. of 5 $mm^2/s$ or more and 250 $mm^2/s$ or less. The reason for this is as follows: when the base oil has a higher kinematic viscosity than the refrigerant, the kinematic viscosity of the base oil is sufficient to lubricate the sliding part of the compressor, and the cooling efficiency of the refrigeration cycle device is prevented from being significantly reduced. The kinematic viscosity of the base oil can be adjusted to be within the above range by changing the molecular structure and the degree of polymerization of each base oil.

(Polyalkylene Glycol)

PAG is a polymer of at least one selected from the group consisting of an ethylene oxide group (EO group) and a propylene oxide group (PO group) and is represented by the following chemical formula 1.

[Chemical formula 1]

[Formula 1]

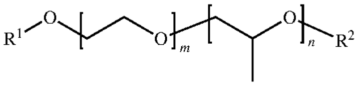

In the above chemical formula 1, m and n are each a numerical value of 0 or more and representing the average of the number of EO groups and PO groups, and $R^1$ and $R^2$ are a hydrogen atom (H) or a hydrocarbon chain having one or more carbon atoms. The arrangement of EO groups and PO groups may be any of a random copolymer, an alternating copolymer, and a block copolymer.

In the above chemical formula 1, m and n preferably satisfy the relationships of the following formulas (1) and (2). When the relationships of the following formulas (1) and (2) are not satisfied, PAG may be solidified at low temperatures.

$$m+n \leq 100 \quad (1)$$

$$n/(m+n) \geq 0.20 \quad (2)$$

$R^1$ and $R^2$ are preferably a hydrocarbon chain having one or more carbon atoms. When $R^1$ and $R^2$ are a hydrogen atom (II), the hygroscopicity of PAG increases, and the moisture may be mixed.

PAG may be PAG having a single structure or a mixture of PAGs having different structures. By using a mixture of PAGs having different structures, the characteristics of the base oil can be adjusted.

(Polyol Ester)

POE is an ester synthesized from a polyhydric alcohol and a fatty acid. Examples of the method for synthesizing POE include, but are not particularly limited to, dehydration condensation of a polyhydric alcohol and a fatty acid.

The fatty acid is a monovalent or divalent fatty acid. The fatty acid may be an unsaturated fatty acid or a saturated fatty acid. The fatty acid may be a linear fatty acid or a branched fatty acid. The fatty acid is preferably a saturated fatty acid. The reason for this is as follows: the saturated fatty acid has high oxidation stability and POE hardly causes deterioration by heat. The number of carbon atoms of fatty acid is preferably 4 to 20. The reason for this is as follows: when the number of carbon atoms of fatty acid is 4 to 20, the kinematic viscosity of POE is sufficient to lubricate the sliding part of the compressor, and the cooling efficiency of the refrigeration cycle device is prevented from being significantly reduced.

Examples of the monovalent fatty acid having 4 to 20 carbon atoms include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, and icosanoic acid. These monovalent fatty acids may include all isomers. These monovalent fatty acids may be linear or branched. More specifically, the monovalent fatty acid may be a fatty acid having a branch on at least one of α-position and β-position, and for example, 2-methylpropanoic acid, 2-methylbutanoic acid, 2-methylpentanoic acid, 2-methylhexanoic acid, 2-ethylpentanoic acid, 2-methylheptanoic acid, 2-ethylhexanoic acid, 3,5,5-trimethylhexanoic acid, and 2-ethylhexadecanoic acid are preferable, and 2-ethylhexanoic acid and 3,5,5-trimethylhexanoic acid are further preferable. This is because the ester is excellent in hydrolysis resistance due to the steric hindrance of the branch.

Examples of the divalent fatty acid having 4 to 20 carbon atoms include glutaric acid, adipic acid, pimelic acid, suberic acid, azelaic acid, and sebacic acid.

The fatty acid may include fatty acids other than the fatty acid having 4 to 20 carbon atoms. Examples of fatty acids other than the fatty acid having 4 to 20 carbon atoms include fatty acids having 21 to 24 carbon atoms, and specific examples thereof include heneicosanoic acid, docosanoic acid, tricosanoic acid, and tetracosanoic acid. These fatty acids may be linear or branched.

The fatty acid constituting POE may be any one of the aforementioned fatty acids or may include two or more thereof.

The polyhydric alcohol is preferably a polyhydric alcohol having 2 to 6 hydroxyl groups. The reason for this is as follows: when the polyhydric alcohol is a polyhydric alcohol having 2 to 6 hydroxyl groups, the kinematic viscosity of POE is sufficient to lubricate the sliding part of the compressor, and the cooling efficiency of the refrigeration cycle device is prevented from being significantly reduced. The number of carbon atoms of the polyhydric alcohol is preferably 4 to 12, and more preferably 5 to 10. As such a polyhydric alcohol, a hindered alcohol such as neopentyl glycol, trimethylolethane, trimethylolpropane, trimethylolbutane, di-(trimethylolpropane), tri-(trimethylolpropane), pentaerythritol, or dipentaerythritol is preferable.

The polyhydric alcohol constituting POE may be any one of the aforementioned polyhydric alcohols or may include two or more thereof.

POE may be a partial ester in which a part of the hydroxyl groups of a polyhydric alcohol remains as hydroxyl groups without being esterified, a complete ester in which all the hydroxyl groups are esterified, or a mixture of a partial ester and a complete ester.

When the fatty acid is a divalent fatty acid, both carboxyl groups may be esterified or only one carboxyl group may be esterified. When both carboxyl groups of a divalent fatty acid are esterified, one carboxyl group may not be an ester with a polyhydric alcohol, but may be an ester with a monovalent alcohol. The monovalent alcohol preferably has 1 to 20 carbon atoms.

POE may be not only POE having a single structure, but also a mixture of POEs having different structures. By using a mixture of POEs having different structures, the characteristics of the base oil can be controlled.

(Polyvinyl Ether)

PVE is a compound obtained by polymerization reaction of a vinyl ether compound and has a polyvinyl ether structure shown in the following chemical formula 2.

[Chemical formula 2]

[Formula 2]

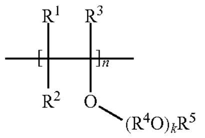

In the above chemical formula 2, $R^1$, $R^2$, and $R^3$ are each a hydrogen atom or a hydrocarbon group having 1 to 8 carbon atoms, and may be the same as one another or may be different from one other. $R^4$ is a hydrocarbon group having 2 to 10 carbon atoms, $R^5$ is a hydrocarbon group having 1 to 10 carbon atoms, and k is a numerical value of 0 or more and 10 or less and represents an average of the number of $R^4O$. $R^1$ to $R^5$ for each constitutional unit may be the same or may be different. When there is a plurality of $R^4O$, the plurality of $R^4O$ may be the same or different from one another. n is a numerical value of two or more and represents an average of the number of constitutional units of the polyvinyl ether structure.

Examples of $R^1$, $R^2$, and $R^3$ include a hydrogen atom (H), alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, and various octyl groups; cycloalkyl groups such as a cyclopentyl group, a cyclohexyl group, various methylcyclohexyl groups, various ethylcyclohexyl groups, and various dimethylcyclohexyl groups; aryl groups such as a phenyl group, various methylphenyl groups, various ethylphenyl groups, and various dimethylphenyl groups; and arylalkyl groups such as a benzyl group, various phenylethyl groups, and various methylbenzyl groups. Among them, a hydrogen atom (H) or a hydrocarbon group having 1 to 5 carbon atoms is preferable, and a hydrogen atom (H) or a hydrocarbon group having 1 to 3 carbon atoms is more preferable.

Examples of $R^4$ include hydrocarbon groups such as an ethylene group, a phenylethylene group, a 1,2-propylene group, a 2-phenyl-1,2-propylene group, a 1,3-propylene group, various butylene groups, various pentylene groups, various hexylene groups, various heptylene groups, various octylene groups, various nonylene groups, and various decylene groups; cycloaliphatic groups that have two binding sites on a cycloaliphatic hydrocarbon, such as cyclohexane, methylcyclohexane, ethylcyclohexane, dimethylcyclohexane, and propylcyclohexane; aromatic hydrocarbon groups such as various phenylene groups, various methylphenylene groups, various ethylphenylene groups, various dimethylphenylene groups, and various naphthylenes; alkyl aromatic groups that have a monovalent binding site on each of the alkyl group moiety and the aromatic moiety of an alkyl aromatic hydrocarbon, such as toluene, xylene, and ethylbenzene; alkyl aromatic groups that have a binding site on an alkyl group moiety of a polyalkyl aromatic hydrocarbon, such as xylene and diethylbenzene. Among these for $R^4$, an alkyl group having 2 to 4 carbon atoms is preferable. k is preferably a numerical value of 0 or more and 5 or less.

Examples of $R^5$ include alkyl groups such as a methyl group, an ethyl group, an n-propyl group, an isopropyl group, an n-butyl group, an isobutyl group, a sec-butyl group, a tert-butyl group, various pentyl groups, various hexyl groups, various heptyl groups, various octyl groups, various nonyl groups, and various decyl groups; cycloalkyl groups such as a cyclopentyl group, a cyclohexyl group, various methylcyclohexyl groups, various ethylcyclohexyl groups, various propylcyclohexyl groups, and various dimethylcyclohexyl groups; aryl groups such as a phenyl group, various methylphenyl groups, various ethylphenyl groups, various dimethylphenyl groups, various propylphenyl groups, various trimethylphenyl groups, various butylphenyl groups, and various naphthyl groups; and arylalkyl groups such as a benzyl group, various phenylethyl groups, various methylbenzyl groups, various phenylpropyl groups, and various phenylbutyl groups. Among these for $R^5$, a hydrocarbon group having 8 or less carbon atoms is preferable. When k is 0, an alkyl group having 1 to 6 carbon atoms is more preferable, and when k is 1 or more, an alkyl group having 1 to 4 carbon atoms is more preferable.

PVE may be not only PVE having a single structure, but also a mixture of PVEs having different structures. By using a mixture of PVEs having different structures, the characteristics of the base oil can be controlled.

(Polyalpha Olefin)

Examples of PAO include one obtained by polymerizing a hydrocarbon monomer having an olefinic double bond. Examples of the hydrocarbon monomer having an olefinic double bond include ethylene, propylene, various butenes, various pentenes, various hexenes, various heptenes, various octenes, diisobutylene, triisobutylene, styrene, α-methylstyrene, and various alkyl-substituted styrenes. The hydrocarbon monomers having an olefinic double bond may be used singly or in combination of two or more.

PAO may be not only PAO having a single structure, but also a mixture of PAOs having different structures. By using a mixture of PAOs having different structures, the characteristics of the base oil can be controlled.

(Alkylbenzene)

AB is a compound in which at least one of the hydrogen atoms of benzene is replaced with a hydrocarbon group. AB is preferably one in which one to four of the hydrogen atoms are each replaced with a hydrocarbon group, and more preferably one in which one or two of the hydrogen atoms are each replaced with a hydrocarbon group. This is because stability and availability are excellent. As the hydrocarbon group, a hydrocarbon group having 1 to 19 carbon atoms is preferable. The reason for this is as follows: when the hydrocarbon group is a hydrocarbon group having 1 to 19 carbon atoms, the kinematic viscosity of AB is sufficient to lubricate the sliding part of the compressor, and the cooling efficiency of the refrigeration cycle device is prevented from being significantly reduced.

Examples of the hydrocarbon group having 1 to 19 carbon atoms include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. These hydrocarbon groups may include all isomers. These hydrocarbon groups may be linear or branched.

AB may be not only AB having a single structure, but also a mixture of ABs having different structures. By using a mixture of ABs having different structures, the characteristics of the base oil can be controlled.

(Alkylnaphthalene)

AN is a compound in which at least one of the hydrogen atoms (II) of naphthalene is replaced with a hydrocarbon group. AN is preferably one in which one to four of the hydrogen atoms (H) are each replaced with a hydrocarbon group, and more preferably one in which one to three of the hydrogen atoms (H) are each replaced with a hydrocarbon group. This is because stability and availability are excellent. The hydrocarbon group is preferably a hydrocarbon group having 1 to 19 carbon atoms. The reason for this is as follows: when the hydrocarbon group is a hydrocarbon group having 1 to 19 carbon atoms, the kinematic viscosity of AN is sufficient to lubricate the sliding part of the compressor, and the cooling efficiency of the refrigeration cycle device is prevented from being significantly reduced.

Examples of the hydrocarbon group having 1 to 19 carbon atoms include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an eicosyl group. These hydrocarbon groups may include all isomers. These hydrocarbon groups may be linear or branched.

AN may be not only AN having a single structure, but also a mixture of ANs having different structures. By using a mixture of ANs having different structures, the characteristics of the base oil can be controlled.

(Mineral Oil)

Mineral oil is a lubricating oil that can be obtained by separation and purification of crude oil. Mineral oil includes paraffinic mineral oil and naphthenic mineral oil, and the mineral oil may be either paraffinic mineral oil or naphthenic mineral oil, or may be a mixture thereof.

(Lubricant Additive)

The refrigeration oil may contain an antioxidant, an acid scavenger, or an extreme-pressure agent (anti-wear agent) as a lubricant additive.

Examples of the antioxidant include phenol-based antioxidants such as 2,6-di-tert-butyl-4-methyl phenol, 2,6-di-tert-butyl-4-ethylphenol, and 2,2'-methylenebis(4-methyl-6-tert-butylphenol), and amine-based antioxidants such as phenyl-α-naphthylamine and N,N'-di-phenyl-p-phenylenediamine. The antioxidant not only suppresses the deterioration of the refrigeration oil, but also has the effect of suppressing the oxidative deterioration of the sulfur-based odorant.

The content of the antioxidant is preferably 0.05% by mass or more and 2% by mass or less, and more preferably 0.2% by mass or more and 1% by mass or less, based on the refrigeration oil. When the content of the antioxidant is less than 0.05% by mass based on the refrigeration oil, the effect of the antioxidant may not be obtained. When the content of the antioxidant is more than 2% by mass based on the refrigeration oil, the kinematic viscosity of the refrigeration oil may be reduced or the deteriorated antioxidant may block the refrigerant circuit as an impurity.

Examples of the acid scavenger include epoxy compounds such as phenyl glycidyl ether, alkyl glycidyl ester, alkyl glycidyl ether, alkylene glycol glycidyl ether, cyclohexene oxide, α-olefin oxide, and epoxidized soybean oil. The acid scavenger is preferably alkyl glycidyl ester, alkyl glycidyl ether, or α-olefin oxide. The acid scavenger captures the acid generated by the deterioration of organic materials (such as an insulating film and a sealing film) that are present in the refrigeration oil and the refrigerant circuit, and thus has the effect of suppressing the deterioration of the sulfur-based odorant caused by acid.

The content of the acid scavenger is preferably 0.05% by mass or more and 10% by mass or less, and more preferably 0.1% by mass or more and 10% by mass or less, based on the refrigeration oil. When the content of the acid scavenger is less than 0.05% by mass based on the refrigeration oil, the effect of the acid scavenger may not be obtained. When the content of the acid scavenger is more than 10% by mass based on the refrigeration oil, the kinematic viscosity of the refrigeration oil may be reduced or the deteriorated acid scavenger may block the refrigerant circuit as an impurity.

Examples of the extreme-pressure agent (anti-wear agent) include phosphorus-based extreme-pressure agents such as phosphate esters, thiophosphate esters, acidic phosphate esters, phosphite esters, acidic phosphite esters and amine salts thereof. The extreme-pressure agent (anti-wear agent) is preferably a phosphate ester, a thiophosphate ester, or a mixture thereof. Specifically, tricresyl phosphate ($O{=}P{-}(OC_7H_7)_3$), triphenyl phosphorothioate ($S{=}P{-}(OC_6H_5)_3$), triphenyl phosphate ($O{=}P{-}(OC_6H_5)_3$), derivatives thereof, or a mixture thereof is preferable. Since the extreme-pressure agent reduces the friction of the sliding part of the compressor, it has the effect of suppressing the deterioration of the sulfur-based odorant caused by friction heat.

The content of the extreme-pressure agent is preferably 0.05% by mass or more and 5% by mass or less, and more preferably 0.1% by mass or more and 4% by mass or less, based on the refrigeration oil. When the content of the extreme-pressure agent is less than 0.05% by mass based on the refrigeration oil, the effect of the extreme-pressure agent may not be obtained. When the content of the extreme-pressure agent is more than 5% by mass based on the refrigeration oil, metal may be corroded by the extreme-pressure agent, the kinematic viscosity of the refrigeration oil may be reduced, or the deteriorated extreme-pressure agent may block the refrigerant circuit as an impurity.

The refrigeration oil may contain an oxygen scavenger. Examples of the oxygen scavenger include sulfur-containing aromatic compounds such as 4,4'-thiobis(3-methyl-6-tert-butylphenol), diphenyl sulfide, dioctyl diphenyl sulfide, dialkyl diphenylene sulfide, benzothiophene, dibenzothiophene, phenothiazine, benzothiapyran, thiapyran, thianthrene, dibenzothiapyran, and diphenylene disulfide; aliphatic unsaturated compounds such as various olefins, diene, and triene; and cyclic terpenes having an unsaturated bond, such as α-pinene, β-pinene, limonene, and phellandrene. The oxygen scavenger is preferably an aliphatic unsaturated compound or a cyclic terpene having an unsaturated bond. The oxygen scavenger not only suppresses the oxidative deterioration of the refrigeration oil, but also has the effect of suppressing the oxidation deterioration of the sulfur-based odorant.

The content of the oxygen scavenger is preferably 0.05% by mass or more and 5% by mass or less, and more preferably 0.1% by mass or more and 3% by mass or less, based on the refrigeration oil. When the content of the oxygen scavenger is less than 0.05% by mass based on the refrigeration oil, the effect of the oxygen scavenger may not be obtained. When the content of the oxygen scavenger is more than 5% by mass based on the refrigeration oil, the kinematic viscosity of the refrigeration oil may be reduced or the deteriorated oxygen scavenger may block the refrigerant circuit as an impurity.

(Others)

The refrigeration oil may contain a fluorescent agent, a colorant, or the like so as to visually detect the refrigerant and the refrigeration oil. Preferably, the amount of the fluorescent agent and colorant added is not more than the saturated solubility of the refrigeration oil so as not to cause precipitation at low temperatures.

When moisture is contained in the refrigeration oil, the deterioration of the refrigerant, refrigeration oil, metals in the refrigerant circuit, organic materials (such as polyester) in the refrigerant circuit, and the others may be promoted, and thus, it is necessary to control the amount of the moisture contained in the refrigeration oil to be filled so as to be 300 ppm by mass or less, and preferably 100 ppm by mass or less.

The refrigeration cycle device has been described above with reference to a mode in which a rotary compressor is used as compressor 3, but the refrigeration cycle device is not limited thereto. For example, a low-pressure shell or high-pressure shell scroll compressor, a screw compressor, or the others may be used as compressor 3.

(Ratio of Number of Oxygen Atoms to Number of Carbon Atoms in Molecular Structure of Base Oil)

The ratio of the number of oxygen atoms (O) to the number of carbon atoms (C) in the molecular structure of the base oil (O/C ratio) (hereinafter, also simply referred to as the "O/C ratio") is less than 0.50. When the O/C ratio is less than 0.50, polarity due to polarization is low, the intermolecular interaction between the base oil and the sulfur-based odorant is small, the amount of the sulfur-based odorant dissolved in the base oil is small, and the refrigerant released from the refrigerant circuit is recognizable by the sense of smell. The O/C ratio is preferably 0.43 or less, and more preferably 0.39 or less. The lower limit of the O/C ratio is not particularly limited, and may be 0 like the hydrocarbon oil.

Other refrigeration oils may be mixed in the refrigeration oil, as long as the O/C ratio in the molecular structure of the base oil is lower than that of PAG. Examples of other refrigeration oils include polyol ester, polyvinyl ether, alkylbenzene, alkylnaphthalene, mineral oil, poly α-olefin, or a mixture thereof. Since polyol ester and polyvinyl ether have low miscibility with a hydrocarbon having 1 to 4 carbon atoms like PAG, the amount of the refrigerant dissolved is small and the amount of the refrigerant to be filled can be reduced. Accordingly, polyol ester and polyvinyl ether are preferable.

As long as the O/C ratio is less than 0.50, the base oil may not have a single structure, and may be a mixture of base oils having different structures. The O/C ratio of the mixture can be calculated by determining the weighted average of the O/C ratio from the molar ratio of each base oil to the whole base oil. For example, in the case of a base oil in which POE (a completely esterified product of pentaerythritol and 2-ethylhexanoic acid) having an O/C ratio of 8/37 is mixed with PVE (a polymer in which $R^1$, $R^2$, and $R^3$ are hydrogen atoms (H), k is 0, $R^5$ is an ethyl group, and n is 10 in the aforementioned chemical formula 2) having an O/C ratio of 1/4 at a molar ratio of 1:1, the O/C ratio is $8/37 \times 0.5 + 1/4 \times 0.5 = 69/236$.

The sulfur-based odorant contained in the refrigerant is a polar molecule having a dipole moment due to deviation of charge, in a molecule. For example, according to the literature (J. Am. Chem. Soc., Vol. 61, P. 1769-1780, 1939), the magnitude of the dipole moment of THT is 1.87 D. Since the dipole moments of $H_2O$ and $CH_3OH$, which are considered as polar solvents, are 1.9 D and 1.7 D, respectively, THT is a polar molecule having a large dipole moment. In addition, according to the literature (J. Chem. Phys., Vol. 1, P. 337-340, 1933), it is reported that the dipole moments of mercaptans are about 1.3 D to 1.5 D, and that the dipole moments of sulfides are about 1.4 D to 1.58 D. Thus, they are polar molecules like THT.

As described above, since the sulfur-based odorant is a polar molecule, the sulfur-based odorant is dissolved in the base oil by an electrical interaction with polar groups (moieties having a bond between C and O) of the base oil. Since a base oil having a large O/C ratio has a large number of polar groups in the molecular structure, a strong electrical interaction occurs between the polar groups and the sulfur-based odorant. Consequently, when a base oil having a large O/C ratio is mixed with the sulfur-based odorant, the sulfur-based odorant is hardly released.

Since the hydrocarbon having 1 to 4 carbon atoms that is the main component functioning as the refrigerant does not have a polar group in the molecule, it is a nonpolar molecule having a significantly small bias of charge. For example, according to the literature (J. Chem. Phys., Vol. 33, No. 5, P. 1519-1522, 1960), the dipole moment of R-290 is a value as small as 0.083 D, and R-290 is thus a nonpolar molecule. According to the literature (J. Chem. Phys., Vol. 27, No. 4, P. 868-873, 1957), the dipole moment of R-1270 is 0.364 D, and according to another literature (J. Chem. Phys., Vol. 29, No. 4, P. 914-920, 1958), the dipole moment of R-600a is 0.132 D. Thus, since the hydrocarbon having 1 to 4 carbon atoms does not have a polar group in the molecule, it is a nonpolar molecule having a significantly small bias of charge.

Since the hydrocarbon having 1 to 4 carbon atoms is a nonpolar molecule as described above, the solubility of the sulfur-based odorant in the hydrocarbon having 1 to 4 carbon atoms is low. When the hydrocarbon having 1 to 4 carbon atoms is dissolved in the base oil, the solubility of the sulfur-based odorant in the base oil is reduced. Since a base oil having a larger O/C ratio has a larger number of polar groups in the molecular structure, the solubility of the hydrocarbon having 1 to 4 carbon atoms, which is a non-polar molecule, is low. Since a base oil having a smaller O/C ratio has higher solubility of the hydrocarbon having 1 to 4 carbon atoms, a large number of hydrocarbons having 1 to 4 carbon atoms is dissolved in the base oil. Thus, the solubility of the sulfur-based odorant in the base oil is lower, and the sulfur-based odorant is more easily released.

For example, even when a base oil having an O/C ratio of 0.50 or more is mixed with another base oil so as to reach a weighted average of the O/C ratio less than 0.50, the polarity of the whole base oil is reduced, the amount of the sulfur-based odorant dissolved is small, and the refrigerant released from the refrigerant circuit is recognizable by the sense of smell.

<HSP Distance>

The difference between the HSP distance between the base oil and the sulfur-based odorant and the HSP distance between the base oil and the hydrocarbon having 1 to 4 carbon atoms ([the HISP distance between the base oil and the sulfur-based odorant]−[the HSP distance between the base oil and the hydrocarbon having 1 to 4 carbon atoms]) is −2.0 or more. Hereinafter, the HSP distance between the base oil and the sulfur-based odorant is sometimes referred to as "the HSP distance to the sulfur-based odorant", and the HSP distance between the base oil and the hydrocarbon having 1 to 4 carbon atoms is sometimes referred to as "the HSP distance to the hydrocarbon", respectively.

Herein, "HSP" means "Hansen Solubility Parameter", and is a value used to predict the solubility of substances based on the idea that "substances having similar intramolecular interactions are easily dissolved in each other". Specifically, HISP is represented as a three-dimensional vector by three parameters (dD, dP, and dH), which are a dispersion term, a polar term, and a hydrogen bond term, respectively. As for two substances, the solubility is higher, as their vectors (dD, dP, and dH) are similar.

The HSP of a substance can be cited from the database and calculated from the molecular structure by using computer software, HSPiP (Hansen Solubility Parameter in Practice) Ver. 5.3.

The "HSP distance" is the distance between HSP values of two substances, and is a value indicating the similarity of vectors ((dD1, dP1, and dH1) and (dD2, dP2, and dH2)) of two substances. Specifically, it is determined by the following formula (3) based on the above three parameters (dD, dP, and dH). With respect to two substances whose HSP distances are to be calculated, dD, dP, and dH of one substance are represented by dD1, dP1, and dH1, and dD, dP, and dH of another substance are represented by dD2, dP2, and dH2, in the following formula (3). As for two substances, the solubility is lower, as the HSP distance is larger.

$$HSP\ \text{distance} = \{4 \times (dD1 - dD2)^2 + (dP1 - dP2)^2 + (dH1 - dH2)^2\}^{0.5} \quad (3)$$

As the amount of the sulfur-based odorant dissolved in the base oil is smaller, the amount of the sulfur-based odorant that circulates in the refrigerant circuit is larger, and the refrigerant released from the refrigerant circuit is recognizable by the sense of smell. In addition, as the amount of the hydrocarbon having 1 to 4 carbon atoms dissolved in the base oil is larger, the amount of the sulfur-based odorant dissolved in the base oil is smaller for the reason described below, and as a result, the amount of the sulfur-based odorant circulates in the refrigerant circuit is larger, so that the refrigerant released from the refrigerant circuit is recognizable by the sense of smell. Namely, as the difference between the HSP distance to the sulfur-based odorant and the HSP distance to the hydrocarbon ([the HSP distance to the sulfur-based odorant]-[the HSP distance to the hydrocarbon]) is larger, the amount of the sulfur-based odorant dissolved in the base oil is smaller, a larger amount of the sulfur-based odorant is contained in the refrigerant released from the refrigerant circuit, and the refrigerant released from the refrigerant circuit is recognizable by the sense of smell.

When the difference between the HSP distance to the sulfur-based odorant and the HSP distance to the hydrocarbon is −2.0 or more, the amount of the sulfur-based odorant dissolved in the base oil is sufficiently small, and the refrigerant released from the refrigerant circuit is recognizable by the sense of smell. The difference between the HSP distance to the sulfur-based odorant and the HSP distance to the hydrocarbon is preferably −0.5 or more, and more preferably −0.4 or more. The upper limit of the difference between the HSP distance to the sulfur-based odorant and the HSP distance to the hydrocarbon is not particularly limited, but the difference may be 10 or less, or 5.0 or less.

EXAMPLES

Hereinafter, the present disclosure will be described in detail with reference to Examples, but the present disclosure is not limited to these Examples.

<Evaluation Test 1>

Refrigerant gas in which a refrigerant, a sulfur-based odorant, and a refrigeration oil were mixed was prepared under the conditions shown in Table 1 to evaluate the amount of the sulfur-based odorant released with the refrigerant when the refrigerant, the sulfur-based odorant, and the refrigeration oil were mixed. As the refrigeration oil, one including PAG as the base oil was used. In the base oil, m was 7 (a value rounded off to the nearest integer), n was 36 (a value rounded off to the nearest integer), and $R^1$ and $R^2$ were $CH_3$, in the aforementioned chemical formula 1. The concentration of the sulfur-based odorant (THT) in the refrigerant gas is shown in Table 2.

TABLE 1

| | |
|---|---|
| Test container | Portable reactor (TVS-N2-50 manufactured by Taiatsu Techno Corporation) |
| Container capacity | 50 $cm^3$ |
| Refrigerant | R-290 (ECO FREEZE 290 manufactured by IWATANI INDUSTRIAL GASES CORPORATION) |
| Mass of refrigerant | 10.0 g |
| Sulfur-based odorant | THT (T0114 manufactured by Tokyo Chemical Industry Co., Ltd.) |
| Mass of PAG | 10.0 g |
| Amount of moisture in PAG | 100 ppm by mass or less based on the total amount of refrigeration oil |

TABLE 2

| Test No. | THT Concentration in refrigerant gas (ppm by mass) |
|---|---|
| 1-1 | 2.3 |
| 1-2 | 24 |
| 1-3 | 180 |
| 1-4 | 190 |
| 1-5 | 600 |
| 1-6 | 987 |
| 1-7 | 1740 |
| 1-8 | 2230 |

The above refrigerant gas was enclosed in a test container, which was shaken at 140° C. to stir the refrigerant gas, and then, the test container was allowed to stand still at 25° C. 24 hours after the start of still standing, a tedlar bag (1-2711-05 manufactured by AS ONE Corporation) was connected to the discharge port of the test container, and the refrigerant gas was collected at 25° C. For the collected refrigerant gas, the concentration of THT was measured by using a gas chromatography mass spectrometer (JMS-K9 manufactured by JEOL Ltd.).

Figure 3:
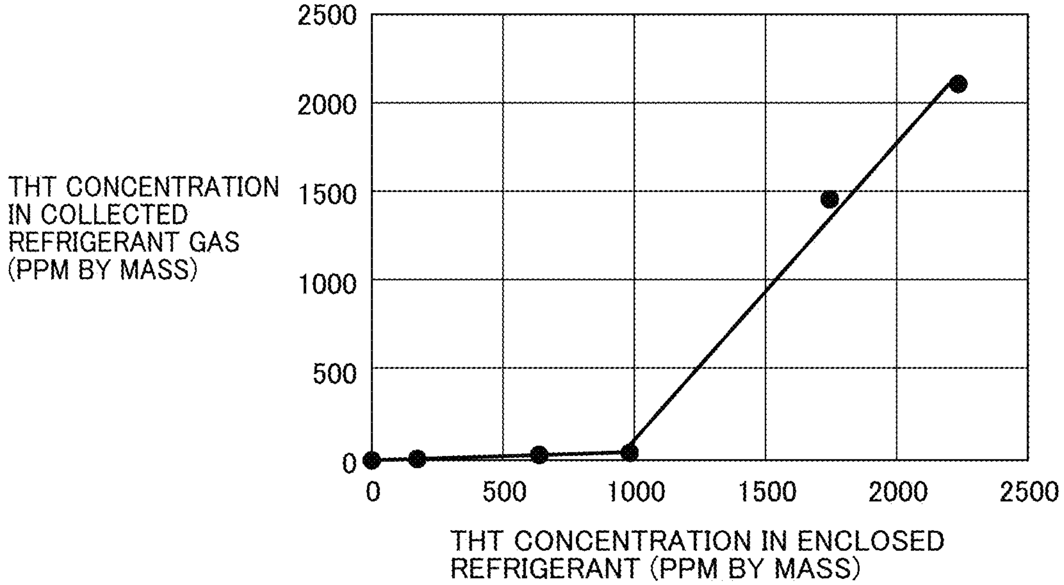
FIG. 3 is a graph showing a relationship between the concentration of tetrahydrothiophene in an enclosed refrigerant and the concentration of tetrahydrothiophene in collected refrigerant gas.

The relationship between the concentration of THT in the enclosed refrigerant gas and the concentration of THT in the collected refrigerant gas is shown in FIG. 3. The concentration of THT in the collected refrigerant gas was increased in a linear relation in a range of the concentration of THT in the enclosed refrigerant gas from 2.3 ppm by mass to 987 ppm by mass, and increased in a linear relation with a larger inclination in a range from 987 ppm by mass to 2,230 ppm by mass. The expression of the approximate line in FIG. 3 was $y=0.047x$ in the range of the concentration of THT from 2.3 ppm by mass to 987 ppm by mass, and $y=1.66x-774$ in the range from 987 ppm by mass to 2,230 ppm by mass. Specifically, in the range of the concentration of THT in the enclosed refrigerant gas from 2.3 ppm by mass to 987 ppm by mass, the amount of THT released with R-290 was about 4.7% of the enclosed THT, and the remaining, about 95.3%, kept in a state dissolved in PAG and was not released as the gas.

Even when THT was mixed in R-290 as described above, THT was dissolved in PAG, so that only a part of THT in the enclosed refrigerant gas was released with R-290, and the refrigerant was demonstrated to be hardly detectable by the sense of smell when the refrigerant was released from the refrigeration cycle device.

<Evaluation Test 2>

Each sample gas in which air was mixed with a sulfur-based odorant (THT) was prepared under the conditions shown in Table 3 to quantitatively evaluate the relationship between the concentration of the sulfur-based odorant in air and the intensity of the odor. The concentration of THT in the sample gas is shown in Table 4.

TABLE 3

| | |
|---|---|
| Sampling container | Smart Bag PA (AA-5 manufactured by GL Sciences Inc.) |
| Air used | High purity air (ZERO-A manufactured by Sumitomo Seika Chemicals Company, Limited.) |
| Air volume | 3000 $cm^3$ |
| THT used | THT (T0114 manufactured by Tokyo Chemical Industry Co., Ltd.) |
| Evaluation device | Fragrance analyzer (FF-2020S system manufactured by SHIMADZU CORPORATION) |

TABLE 4

| Sample No. | THT Concentration in sample gas (ppb by volume) |
|---|---|
| 2-1 | 3.0 |
| 2-2 | 10 |
| 2-3 | 100 |
| 2-4 | 300 |
| 2-5 | 1000 |
| 2-6 | 3000 |

The odor index (equivalent value) of the above sample gas was measured. Herein, the "odor index" is a numerical expression for the degree of odor using the human sense of smell, and is a value obtained by multiplying the common logarithm of the odor concentration of an odor component (the concentration of the odor component when the odor is diluted with air to the extent that the odor can no longer be sensed by the human sense of smell) by 10. The "odor index (equivalent value)" is a numerical value corresponding to the odor index and obtained by the measurement with an odor identification device. In the measurement, nitrogen ($N_2$) was used as the carrier gas, and the dilution factor of the sample with the carrier gas was set to 100.

Figure 4:
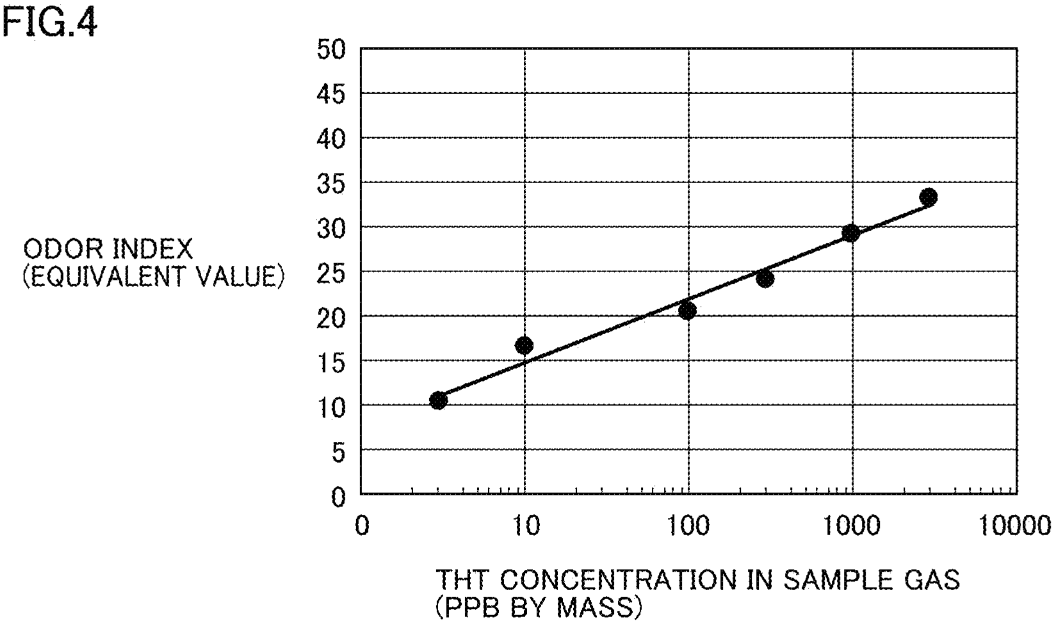
FIG. 4 is a graph showing a relationship between the concentration of tetrahydrothiophene in a sample gas and the odor index (equivalent value).

The relationship between the concentration of THT in the sample gas and the odor index (equivalent value) is shown in FIG. 4. The concentration of THT in the sample gas and the odor index (equivalent value) were in a logarithmic function relationship. This means that the results following the rule of Weber-Fechner, which represents the relationship between the concentration of an odor substance and the intensity of the odor, were obtained. In the present test, high purity air was used as the gas for diluting THT. However, also in the case where THT is diluted with R-290, the same correlation is considered to be obtained for the concentration of THT and the odor index (equivalent value) because R-290 is odorless.

The odor index has a relationship with the odor intensity in the 6-step odor intensity display method as shown in Table 5. The concentrations of THT shown in Table 5 were the results of the determination of the concentration of THT corresponding to an odor intensity of 2.5 to 3.5, based on the relationship between the concentration of THT and the odor index (equivalent value) in FIG. 4.

TABLE 5

| Odor intensity | Detail | Odor index | THT Concentration (ppb by volume) |
|---|---|---|---|
| 0 | Odorless | 0 to less than 10 | 0 to less than 2.1 |
| 1 | An odor is sensed with difficulty | | |
| 2 | A weak odor whose odor source can be seen | 10 to 15 | 2.1 to 10 |
| 3 | An odor is sensed with ease | 12 to 18 | 4.1 to 29 |
| 4 | Strong odor | 14 to less than 21 | 7.8 to less than 77 |
| 5 | Intense odor | 21 or more | 77 or more |

To recognize the refrigerant by the sense of smell, the presence of the sulfur-based odorant contained in the refrigerant is needed to be recognized. Accordingly, the odor intensity of the refrigerant is preferably 2 (a weak odor whose odor source can be seen) or more, and more preferably 3 (an odor is sensed with ease) or more.

The refrigerant released from the refrigerant circuit into the atmosphere is diluted with air, and the concentration of THT is reduced. The international standard ISO-13734 relating to the odorization treatment of natural gas states that the natural gas is needed to have an odor even when being diluted to 20% by volume of the lower flammability limit (LFL). The LFL of R-290 is 21,000 ppm by volume in ISO-817, and 20% of the LFL is thus 4,200 ppm by volume.

As for the odorization treatment of gas, the Japanese ordinance on the odorization treatment of gas (an ordinance that establishes technical standards of gas facilities (Ordinance of the Ministry of International Trade and Industry No. 111 of 2000)) states that it is necessary to enable "the presence or absence of an odor to be sensed when the mixed volume ratio of gas to the air is 1/1,000". Accordingly, when the concentration of R-290 is diluted to 1,000 ppm by volume in the air, R-290 needs to be recognized by the odor, and thus, a stronger odorization treatment than ISO-13734 is required.

In mixed gas of the air and THT in which 1,000 ppm of R-290 is contained, THT needs to be contained in a concentration of 2.1 ppb by volume or more in order to make the odor intensity of the mixed gas 2 or more. That is, in the mixed gas of R-290 and THT, 2.1 ppm by volume (4.2 ppm by mass) or more of THT is needed to be contained.

To make the odor intensity of the mixed gas to 3 or more, THT needs to be contained in a concentration of 4.1 ppb by volume or more. That is, in the mixed gas of R-290 and THT, 4.1 ppm by volume (8.2 ppm by mass) or more of THT needs to be contained.

As described above, the concentration of THT needed to recognize the refrigerant by the sense of smell was demonstrated by quantitatively clarifying the relationship between the concentration of THT in the sample gas and the intensity of the odor.

In the results of evaluation test 1 shown in FIG. 3, the concentrations of THT to make the THT concentrations in the released refrigerant gas 4.2 ppm by mass and 8.2 ppm by mass are 90 ppm by mass and 176 ppm by mass, respectively. Thus, when PAG used in evaluation test 1 is used in the refrigeration cycle device, the refrigerant gas released from the refrigerant circuit diluted to 1/1,000 in the air is recognizable by the sense of smell, as long as the concentration of THT in the refrigerant is 90 ppm by mass or more.

Meanwhile, when the odor intensity of the air containing the refrigerant gas is 5 (intense odor), the released odor of the refrigerant gas is too unpleasant. In the results of evaluation test 1 shown in FIG. 3, the concentration of THT to make the concentration of THT in the released refrigerant 77 ppm by volume (154 ppm by mass) is 514 ppm by volume (1,026 ppm by mass). In other words, when PAG shown in Table 2 is used in the refrigeration cycle device, the refrigerant gas released from the refrigerant circuit diluted to 1/1,000 in the air does not become a too unpleasant odor, as long as the THT concentration in the refrigerant is less than 1,026 ppm by mass.

However, THT may deteriorate due to, for example, the reaction with mixed oxygen by the operation of the refrigeration cycle device over a long period. Thus, depending on the applications of the refrigeration cycle device, the concentration of THT is preferably set high to sustain the effect of making the refrigerant detectable by the sense of smell over a long period.

The correlation between the concentration of the sulfur-based odorant and the odor index following the rule of Weber-Fechner is not limited to THT. Thus, with respect to any kind of sulfur-based odorants, the concentration at which a sufficient odor can be obtained can be determined by the aforementioned method.

<Evaluation Test 3>

To demonstrate the influence on the results of evaluation test 1 by the molecular structure of the refrigeration oil, each refrigerant gas in which R-290 containing the sulfur-based odorant (THT) serving as the refrigerant was mixed with a refrigeration oil containing PAG shown in Table 6 as the base oil was prepared under the conditions shown in Table 7. The concentration of THT in the refrigerant was 600 ppm by mass so that the odor intensity of the refrigerant described in Table 5 was 3.

TABLE 6

| PAG No. | m | n | $R^1$ | $R^2$ | O/C Ratio |
|---|---|---|---|---|---|
| 1 | 5 | 0 | H | H | 0.60 |
| 2 | 9 | 0 | $CH_3$ | H | 0.53 |
| 3 | 10 | 6 | $CH_3$ | $CH_3$ | 0.43 |
| 4 | 11 | 8 | H | H | 0.43 |
| 5 | 11 | 8 | $CH_3$ | H | 0.43 |
| 6 | 11 | 8 | $CH_3$ | $CH_3$ | 0.42 |
| 7 | 8 | 13 | $CH_3$ | H | 0.39 |
| 8 | 8 | 13 | $CH_3$ | $CH_3$ | 0.39 |
| 9 | 2 | 17 | H | H | 0.36 |
| 10 | 7 | 36 | $CH_3$ | $CH_3$ | 0.35 |
| 11 | 8 | 42 | $CH_3$ | $CH_3$ | 0.35 |
| 12 | 0 | 17 | H | H | 0.35 |
| 13 | 0 | 16 | $CH_3CH_2CH_2CH_2$ | H | 0.33 |

TABLE 7

| | |
|---|---|
| Test container | Portable reactor (RVS-N2-50 manufactured by Taiatsu Techno Corporation) |
| Container capacity | 50 $cm^3$ |
| Refrigerant | R-290 (ECO FREEZE 290 manufactured by IWATANI INDUSTRIAL GASES CORPORATION) |
| Mass of refrigerant | 10.0 g |
| Sulfur-based odorant | THT (T0114 manufactured by Tokyo Chemical Industry Co., Ltd.) |
| Sulfur-based odorant mass | 6.0 mg (600 ppm by mass based on the total amount of R-290 and THT) |
| Mass of PAG | 10.0 g |
| Amount of moisture in PAG | 100 ppm by mass or less based on the total amount of the refrigeration oil |

The values for the molecular structure of PAG shown in Table 6 were determined based on the number average degree of polymerization of the composition of each PAG, and m and n are values rounded off to the nearest integer. The O/C ratio is a value obtained by rounding off the ratio of the number of oxygen atoms (O) to the number of carbon atoms (C) in the molecular structure to the second decimal place and represented by two significant figures.

The above refrigerant gas was enclosed in a test container, which was shaken at 140° C. to stir the refrigerant gas, and then, the test container was allowed to stand still at 25° C. 24 hours after the start of still standing, a tedlar bag (1-2711-05 manufactured by AS ONE Corporation) was connected to the discharge port of the test container, and the refrigerant gas was collected at 25° C. The collected refrigerant gas was diluted to 1/1,000 with high purity air (ZERO-A manufactured by Sumitomo Seika Chemicals Company, Limited.), and then, the evaluation of the odor intensity was carried out by the odor sensory test method with reference to the literature (Journal of Japan Society of Air Pollution, Vol. 27, No. 2, P. A17-A24, 1992). The results of the odor intensity of the collected refrigerant gas represented by the 6-level odor intensity display method are shown in Table 8. The evaluation was such that the odor intensity of 2 or more was rated as "A", and the odor intensity of 1 or less was rated as "B". The evaluation was carried out by 5 examiners.

TABLE 8

| PAG No. | O/C Ratio | Odor strength | Evaluation |
|---|---|---|---|
| 1 | 0.58 | 0 to 1 | B |
| 2 | 0.53 | 0 to 1 | B |
| 3 | 0.43 | 2 to 3 | A |
| 4 | 0.43 | 2 to 3 | A |
| 5 | 0.43 | 3 to 4 | A |
| 6 | 0.42 | 3 to 4 | A |
| 7 | 0.39 | 3 to 4 | A |
| 8 | 0.39 | 3 to 4 | A |
| 9 | 0.36 | 3 to 4 | A |
| 10 | 0.35 | 3 to 4 | A |
| 11 | 0.35 | 3 to 4 | A |
| 12 | 0.35 | 2 to 3 | A |
| 13 | 0.33 | 3 to 4 | A |

As a result of the above evaluation, the refrigerant gas in which PAG (No. 3 to 13) having an O/C ratio of less than 0.50 was mixed had a sufficiently small amount of THT dissolved in PAG, as described above, and had an odor in the range of the odor intensity of 2 (a weak odor whose odor source can be seen) to the odor intensity of 4 (strong odor), and THT was demonstrated to be contained in the refrigerant gas. The refrigerant gas in which PAG (No. 1 and 2) having an O/C ratio of 0.50 or more was mixed had an odor in the range of the odor intensity of 0 (odorless) to the odor intensity of 1 (an odor is sensed with difficulty), and THT was not demonstrated to be contained in the refrigerant gas.

These results mean that the amount of THT that is dissolved in PAG and not released with the refrigerant gas can be explained by the ratio of the polar groups (moieties having a bond between C and O) in the molecular structure of PAG.

As described above, since THT is a polar molecule having a dipole moment of 1.87 D, THT is incorporated into the molecular chain of PAG by an electrical interaction with polar groups (moieties having a bond between C and O) of PAG and dissolved therein. Since PAG having a large O/C ratio has a large number of polar groups in the molecular structure, a strong electrical interaction of incorporating THT occurs. Consequently, when PAG having a large O/C ratio is mixed with THT, THT is hardly released.

As described above, since R-290 is a nonpolar molecule having a dipole moment of 0.083 D, the solubility of THT in R-290 is low, and when R-290 is dissolved in PAG, the solubility of THT in PAG is reduced. Since PAG having a large O/C ratio has a large number of polar groups in the molecular structure, the solubility of R-290, which is a nonpolar molecule, is low. Since PAG having a low O/C ratio has high solubility of R-290, a larger amount of R-290 is dissolved in PAG. Accordingly, that the solubility of THT in PAG is lower and THT is more easily released.

It is considered that, when the O/C ratio is less than 0.50, the proportion of the polarized group of atoms in the molecular structure of PAG becomes half or less and that the effect of increasing the amount of THT released is achieved. Thus, the O/C ratio is preferably less than 0.50.

From the above results, to circulate THT with R-290 in the refrigerant circuit by suppressing the dissolution of THT in PAG, PAG having an O/C ratio of less than 0.50 is preferably used.

From the results shown in evaluation test 1, the relationship of the O/C ratio and the odor intensity is considered to be obtained also when a hydrocarbon having 1 to 4 carbon atoms other than R-290, a sulfur-based odorant other than THT, and a refrigeration oil other than PAG are used. This is because the amount of the sulfur-based odorant dissolved in the refrigeration oil is determined by the polarity of the base oil, regardless of the type of hydrocarbon having 1 to 4 carbon atoms, sulfur-based odorant, and base oil. Since hydrocarbons having 1 to 4 carbon atoms other than R-290 are nonpolar molecules having a small dipole moment like R-290, as described above, the same results as R-290 are considered to be obtained. Since sulfur-based odorants other than THT are polar molecules having dipole moments similar to THT, as described above, the same results are considered to be obtained. Although the difference in the type of base oil generates the difference in the O/C ratio, it does not change the principle of the dissolution of the sulfur-based odorant.

<Evaluation Test 4>

The results of evaluation test 3 demonstrated that use of PAG as the base oil having a low O/C ratio enabled reduction in the solubility of THT in PAG and release of THT with R-290. However, the difference in the odor intensities of the refrigerants of PAG 3 to 13 cannot be explained. Thus, the correlation between the molecular structure of PAG and the amount of THT released was examined by using HSP. Each HSP of THT, R-290, and PAG of each No. is shown in Table 9. For HSPs of THT and R-290, numerical values registered in the database of HSPiP Ver. 5.3, which is computer software, were used, and the HSP of PAG of each No. was calculated by the Van Krevelen method which was a calculation method mounted on HSPiP Ver. 5.3.

TABLE 9

| Substance name | | O/C Ratio | dD | dP | dH | HSP distance to THT | HSP distance to R-290 |
|---|---|---|---|---|---|---|---|
| THT | | — | 18.6 | 6.7 | 6.0 | — | 14.2 |
| R-290 | | — | 13.1 | 0.0 | 0.0 | 14.2 | — |
| PAG | 1 | 0.58 | 16.6 | 5.0 | 15.7 | 10.6 | 17.9 |
| | 2 | 0.53 | 16.7 | 3.4 | 11.1 | 7.2 | 13.7 |
| | 3 | 0.43 | 15.0 | 2.0 | 7.8 | 8.8 | 8.9 |
| | 4 | 0.43 | 14.8 | 1.9 | 9.9 | 9.8 | 10.6 |
| | 5 | 0.43 | 14.9 | 1.8 | 8.9 | 9.3 | 9.8 |
| | 6 | 0.42 | 15.0 | 1.8 | 7.8 | 8.9 | 8.9 |
| | 7 | 0.39 | 15.0 | 1.7 | 8.5 | 9.1 | 9.5 |
| | 8 | 0.39 | 15.0 | 1.6 | 7.6 | 9.0 | 8.6 |
| | 9 | 0.36 | 15.3 | 1.7 | 9.4 | 9.0 | 10.5 |
| | 10 | 0.35 | 14.7 | 1.1 | 7.3 | 9.7 | 8.0 |
| | 11 | 0.35 | 15.0 | 1.0 | 7.3 | 9.3 | 8.3 |
| | 12 | 0.35 | 15.1 | 1.7 | 9.4 | 9.2 | 10.4 |
| | 13 | 0.33 | 15.1 | 1.7 | 8.2 | 8.9 | 9.3 |

The HSP distance between R-290 and THT is a larger value than the HSP distance between PAG and THT, and the solubility of THT in R-290 is lower than the solubility of THT in PAG. Accordingly, when R-290 is dissolved in PAG, R-290 reduces the solubility of THT in the base oil, and thus, the amount of THT dissolved in PAG is considered to be reduced.

As the HSP distance between PAG and THT is larger, the solubility of THT in PAG is lower. As the HSP distance between PAG and R-290 is smaller, the solubility of R-290 in PAG is larger. Thus, a larger amount of R-290 is dissolved in PAG, and THT is more hardly dissolved in PAG. Accordingly, it is considered that, as the difference between the HSP distance between PAG and THT and the HSP distance between PAG and R-290 is a larger value, the amount of THT dissolved in PAG is smaller, and a large amount of THT is contained in the refrigerant gas released from the refrigerant circuit. The relationship between the difference between the HSP distance between PAG and THT and the HSP distance between PAG and R-290, and the odor intensity in evaluation test 3 is shown in Table 10.

TABLE 10

| PAG No. | O/C Ratio | Difference in HSP distance | Odor strength |
|---|---|---|---|
| 1 | 0.60 | −7.3 | 0 to 1 |
| 2 | 0.53 | −6.5 | 0 to 1 |
| 9 | 0.36 | −1.6 | 2 to 3 |
| 12 | 0.35 | −1.1 | 2 to 3 |
| 4 | 0.43 | −0.8 | 2 to 3 |
| 5 | 0.43 | −0.4 | 3 to 4 |
| 13 | 0.33 | −0.4 | 3 to 4 |
| 7 | 0.39 | −0.3 | 3 to 4 |
| 3 | 0.43 | −0.1 | 3 to 4 |
| 6 | 0.42 | 0.0 | 3 to 4 |
| 8 | 0.39 | 0.3 | 3 to 4 |
| 11 | 0.35 | 1.0 | 3 to 4 |
| 10 | 0.35 | 1.6 | 3 to 4 |

As a result of the above evaluation, the following was demonstrated: when the difference between the HSP distance between PAG and THT and the HSP distance between PAG and R-290 is −2.0 or more, the amount of the sulfur-based odorant dissolved in the base oil is sufficiently small as described above and the released refrigerant gas has an odor intensity of 2 or more; and when the difference is −0.5 or more, the released refrigerant gas has an odor intensity of 3 or more.

From the above results, to circulate THT with R-290 in the refrigerant circuit, PAG having a difference in the HSP distance of −2.0 or more is preferably used, and PAG having a difference in the HSP distance of −0.5 or more is more preferably used.

As a result of the present test, the solubility of THT in PAG was successfully demonstrated in detail with the use of HSP. HSP can explain the solubility between substances regardless of the type of molecule. Thus, it is considered that, with respect to the aforementioned relationship between the difference in the HSP distance and the odor of the refrigerant gas, the same results can be obtained not only for PAG, but also for POE, PVE, and hydrocarbon oil. It is also considered that the same results can be obtained not only for R-290, but also for other hydrocarbons having 1 to 4 carbon atoms, and that the same results can be obtained not only for THT, but also for sulfur-based odorants other than THT.

<Evaluation Test 5>

By using a commercially available air conditioner for households (indoor unit model number: MSZ-GV5620S/outdoor unit model number: MUCZ-G5620S manufactured by Mitsubishi Electric Corporation) having a refrigerant circuit, the refrigerant gas released from the refrigerant circuit was collected. In the refrigerant circuit, 450 g of R-290 was enclosed as the main component of the refrigerant, and 290 mg (643 ppm by mass based on the mass of the refrigerant) of THT was enclosed as the sulfur-based odorant. In the compressor, 400 g of a refrigeration oil containing PAG (PAG No. 10 of evaluation test 3) used in evaluation test 1 as the base oil was enclosed as the refrigeration oil.

The air conditioner for households was operated, and then, while stopping the air conditioner for households, the refrigerant gas was released from the point between the expansion valve and the evaporator and collected in a tedlar bag (1-2711-05 manufactured by AS ONE Corporation). The collected refrigerant gas was diluted to 1/1,000 with using high purity air (ZERO-A manufactured by Sumitomo Seika Chemicals Company, Limited.), and then, the sensory evaluation of the odor was carried out. The sensory evaluation was carried out by 5 examiners as in evaluation test 3.

As the result, the odor of the refrigerant gas was an odor intensity of 3 to 4. For ascertainment, the concentration of THT of the collected refrigerant gas was analyzed by using a gas chromatography mass spectrometer (JMS-K9 manufactured by JEOL Ltd.) as in evaluation test 1, and as the result, THT was contained in the refrigerant gas in a concentration of 80 ppm by mass (40 ppm by volume). That is, the THT concentration was 40 ppm by volume when the collected refrigerant gas was diluted to 1/1,000 with high purity air. Accordingly, it corresponds to the odor intensity of 4 in the odor intensity in evaluation test 2, and it was demonstrated to be not inconsistent with the results of the sensory evaluation.

From the above results, the following was demonstrated: when PAG having a low solubility of THT is used, the dissolution of THT in PAG is suppressed, THT is allowed to circulate in the refrigerant circuit with R-290, and the refrigerant gas released from the refrigerant circuit is recognizable by the sense of smell.

The refrigerant, the sulfur-based odorant, and the refrigeration oil are not limited to those used in evaluation tests 1 to 5, and the concentration of the sulfur-based odorant is also not limited. Also, other sulfur-based odorants can be appropriately adjusted by calculation of the O/C ratio, HSP distance, and the others of the refrigeration oil so that a sufficient odor can be obtained.

The embodiments and examples disclosed herein should be considered to be exemplary in all respects and not restrictive. The scope of the present disclosure is indicated by the scope of claims rather than the above description, and is intended to include the meaning equivalent to the scope of claims and all modifications within the scope.

REFERENCE SIGNS LIST

1 Outdoor unit; 2 Indoor unit; 3 Compressor; 4 Condenser; 5 Outdoor blower; 6 Expansion valve; 7 Evaporator; 8 Indoor blower; 9 Liquid pipe; 10 Gas pipe; 11 Shell; 12 Compression mechanism; 13 Electric motor; 14 Inlet pipe; 15 Discharge pipe; 16 Accumulator; 17 Rolling piston; 18 Cylinder; 19 Cylinder chamber; 20 Upper bearing; 21 Discharge hole of upper bearing; 22 Muffler space; 23 Discharge muffler; 24 Discharge hole of discharge muffler; 25 Electric motor rotor; 26 Electric motor stator; 27 Oil reservoir part; 28 Driving shaft; 100 Refrigerant circuit.

The invention claimed is:

1. A refrigeration cycle device comprising:

a refrigerant circuit comprising a compressor, wherein a refrigerant is enclosed in the refrigerant circuit, the refrigerant contains a hydrocarbon having 1 to 4 carbon atoms and a sulfur-based odorant, a refrigeration oil is stored in the compressor of the refrigerant circuit, the refrigeration oil contains a base oil, the base oil is an oxygen-containing oil (excluding polyalkylene glycol), a ratio of a number of oxygen atoms to a number of carbon atoms in a molecular structure of the base oil is less than 0.50, the sulfur-based odorant is intermixed with the refrigeration oil containing the base oil, and at least one component of another molecular structure of the base oil has a second ratio of a number of oxygen atoms to a number of carbon atoms greater than 0.50.

2. The refrigeration cycle device according to claim 1, wherein the sulfur-based odorant is tetrahydrothiophene, and the refrigerant is propane.

3. The refrigeration cycle device according to claim 1, wherein a concentration of the sulfur-based odorant in the refrigerant is 50 ppm by mass or more and less than 1,100 ppm by mass.

4. The refrigeration cycle device according to claim 1, wherein the refrigerant includes a non-sulfur-based odorant.

5. A refrigeration cycle device comprising:

a refrigerant circuit comprising a compressor, wherein a refrigerant is enclosed in the refrigerant circuit, the refrigerant contains a hydrocarbon having 1 to 4 carbon atoms and a sulfur-based odorant, a refrigeration oil is stored in the compressor of the refrigerant circuit, the refrigeration oil contains a base oil, the base oil contains polyalkylene glycol represented by the following chemical formula 1:

a ratio of a number of oxygen atoms to a number of carbon atoms in a molecular structure of the base oil is less than 0.50,

[Chemical formula 1]

[Formula 1]

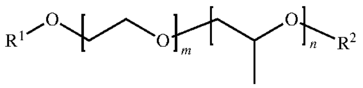

wherein m and n are each a numerical value of 0 or more and represent an average of the number of ethylene oxide groups and propylene oxide groups, and $R^1$ and $R^2$ are a hydrogen atom or a hydrocarbon chain having one or more carbon atoms, m and n satisfy the following formula (1) and formula (2):

$$m+n \leq 100 \quad (1)$$

$$n/(m+n) \geq 0.20. \quad (2)$$

the sulfur-based odorant is intermixed with the refrigeration oil containing the base oil, and at least one component of another molecular structure of the base oil has a second ratio of a number of oxygen atoms to a number of carbon atoms greater than 0.50.

6. The refrigeration cycle device according to claim 5, wherein the sulfur-based odorant is tetrahydrothiophene, and the refrigerant is propane.

7. The refrigeration cycle device according to claim 5, wherein a concentration of the sulfur-based odorant in the refrigerant is 50 ppm by mass or more and less than 1,100 ppm by mass.

8. The refrigeration cycle device according to claim 5, wherein the refrigerant includes a non-sulfur-based odorant.

* * * * *